United States Patent [19]

Oda et al.

[11] Patent Number: 4,776,703
[45] Date of Patent: Oct. 11, 1988

[54] CONTINUOUS TREATMENT APPARATUS FOR VISCOUS MATERIAL

[75] Inventors: Chikao Oda; Sachihiro Yoshimatsu, both of Kudamatsu; Kazuo Ishida, Tokuyama; Takatoshi Kinoshita, Kudamatsu; Hirohiko Shindoh, Kudamatsu; Hidekazu Nakamoto, Kudamatsu, all of Japan

[73] Assignee: Hitachi, Ltd., Tokyo, Japan

[21] Appl. No.: 928,052

[22] Filed: Nov. 7, 1986

[30] Foreign Application Priority Data

Nov. 11, 1985 [JP] Japan .................. 60-250815
Feb. 19, 1986 [JP] Japan .................. 61-33022

[51] Int. Cl.⁴ .................. B01F 7/02; B01F 7/04; B01F 15/02
[52] U.S. Cl. .................. 366/97; 366/297; 366/300; 366/301; 425/204; 425/209
[58] Field of Search ............. 366/66, 70, 97, 297–301; 425/200, 204, 209, 238

[56] References Cited

U.S. PATENT DOCUMENTS

| | | | |
|---|---|---|---|
| 639,022 | 12/1899 | Cooper | 366/301 |
| 882,114 | 3/1908 | Jones | 366/301 |
| 946,475 | 1/1910 | Talley | 366/97 |
| 2,102,255 | 12/1937 | Campbell | 366/300 X |
| 3,640,509 | 2/1972 | Inamura et al. | 366/300 |
| 3,689,035 | 9/1972 | List | 366/297 X |
| 3,901,482 | 8/1975 | Kieffaber | 366/301 X |
| 4,493,557 | 1/1985 | Nayak et al. | 366/300 |

FOREIGN PATENT DOCUMENTS 49-40732 11/1974 Japan .
52-29019 7/1977 Japan .
60-29733 7/1985 Japan .

Primary Examiner—John Petrakes
Attorney, Agent, or Firm—Antonelli, Terry & Wands

[57] ABSTRACT

The present invention comprises a pair of agitator blades which have a plurality of annular members connected to each other and which are provided in parallel in a cylindrical vessel body, the agitator blades being held so that the edges of one of the agitator blades enter the rotational region of the other agitator blade and pass therethrough. Consequently, the invention prevents liquid to be treated from adhering to and rotating together with rotational shafts and the agitator blades and deterioration in product quality due to scaling so as to enable the continuous treatment of a highly viscous material.

18 Claims, 9 Drawing Sheets

CONTINUOUS TREATMENT APPARATUS FOR VISCOUS MATERIAL

BACKGROUND OF THE INVENTION

The present invention relates to a continuous treatment apparatus for a viscous material which is preferable for the continuous condensation polymerization, for example, of polyethyleneterephthalate and polycarbonate.

In general, in continuous treatments such as the kneading and reaction of a viscous material, it is required to minimize dead space in the apparatus and provide operation as similar to a piston flow. To meet these requirements, there have been various inventions in which a long cylindrical vessel is used and two rotational shafts having agitator blades are provided thereon in the longitudinal direction. For example, Japanese Patent Publication No. 29019/1977 discloses an apparatus in which paddle vanes are arranged in several stages so as to enable the scraping of the entire inner surface of a vessel and ensure that there is little dead space therein. However, as shown in FIG. 22, when the viscosity of the liquid being treated rises to several thousand poise, this apparatus has the problem that a lump of highly viscous liquid 31 adhering to the surfaces of rotational shafts 30 rotates together with the surfaces of te rotational shafts 30, resulting in scaling, etc. Namely, the liquid 31 temporarily adhering to the surfaces of the rotational shafts 30 has a lower speed in the liquid, compared with liquid adhering to agitator blades 32, and, since the liquid has a weak shear force, it is difficult to renew and so rotates adhered to the shaft surfaces.

An attempt has been made to remove these rotational shafts 30 so as to reduce this co-rotation. Japanese Patent Publication No. 40732/1974 proposes an apparatus in which the outer peripheries of discs with holes are connected so as to omit the need for the rotation shafts 30. This apparatus produces no corotation with the rotational shafts 30, but has the problem that, as shown in FIG. 23, highly viscous liquid 34 adhering to the surfaces of plate-shaped agitator blades 33 flows with difficulty and rotates together with the agitator blades 33, resulting in scaling, etc. In other words, if bodies having plane surfaces such as plates are rotated in a liquid of a high viscosity, as shown in FIG. 23, the highly viscous liquid 34 rotates together with the agitator blades 33 as the agitator blades 33 rotate, while the highly viscous liquid which has adhered temporarily to the surfaces of the plates adheres to the surfaces of the agitator blades 33 and rotates therewith, because of the weak shear force except at the edges of the agitator blades 33.

As described above, the adhesion of a high viscous liquid to the surfaces of rotation shafts and plate-shaped agitator blades results in a deterioration in the quality of the liquid being treated due to heat aging.

A conventional continuous treatment apparatus for a highly viscous material, as described in Japanese Patent Publication No. 29733/1985, is provided with an extraction pump in a lower portion of an outlet nozzle for the liquid being treated and thus needs a drive apparatus for extraction which is separate from the driving of agitator blades in the vessel body. Furthermore, the conventional apparatus also needs a quantitative supply apparatus for the liquid being treated which is separate from the vessel body.

The above-described prior art necessitates a separate drive apparatus for the agitator blades in the vessel body, the extraction pump, and the supply pump, and so has the problems because of its complicated structure and a high production costs.

SUMMARY OF THE INVENTION

In consideration of the problem of the conventional apparatus in that a highly viscous liquid rotates together with the surfaces of rotational shafts and plate-shaped agitator blades, it is an object of the present invention to provide a continuous treatment apparatus for a highly viscous material which has no rotational shafts and no plate-shaped portions, is capable of completely scraping off the materials within a vessel, and has agitator blades comprising bar rectangular frames which exhibit good mixing and extrusion flow characteristics. It is another object of the present invention to provide a continuous treatment apparatus for a highly viscous material comprising a gear chamber adjacent to an agitation chamber at the end of a cylindrical vessel in the longitudinal direction thereof, a gear engaging with each other and provided on two rotational lug shafts which pass through the gear chamber, and a continuous passage in a portion of the gear chamber which is connected to the agitation chamber, another portion of the gear chamber being connected to a nozzle communicating with the outside of the system so that the liquid being treated is agitated and transferred at the same time by the rotation of the rotational lug shafts.

BRIEF DESCRIPTION OF THE DRAWINGS

FIG. 1 is a partially sectioned plan view;

FIG. 2 is a sectional view taken along the line II—II of FIG. 1;

FIG. 3 is a sectional view taken along the line III—III of FIG. 1;

FIG. 4 is a sectional view taken along the lines $A_1$—$A_1$ or $A_3$—$A_3$ in FIG. 1;

FIG. 5 is a sectional view taken along the lines $A_2$—$A_2$ in FIG. 1;

FIG. 6 is a sectional view taken along the lines $B_1$—$B_1$ or $B_2$—$B_2$ in FIG. 1;

FIGS. 7 to 9 and FIG. 12 are side views of agitator blades comprising bar rectangular frames;

FIGS. 10 and 11 are diagrams illustrating the connection of the agitator blades comprising bar rectangular frames;

FIG. 13 is a sectional view taken along the line II—II in FIG. 1;

FIG. 14 is a sectional view taken along the line IV—IV in FIG. 3;

FIG. 17 is a partially sectioned plan view of the continuous treatment apparatus;

FIG. 18 is a sectional view taken along the line XVIII—XVIII in FIG. 17;

FIGS. 19 and 20 are sectional views taken along the line XIX—XIX in FIG. 20;

FIG. 21 is a sectional view taken along the line XXI—XXI in FIG. 20;

DESCRIPTION OF THE EMBODIMENTS

An embodiment of the present invention is described hereinafter with reference to FIGS. 1 to 6.

Figure 2:
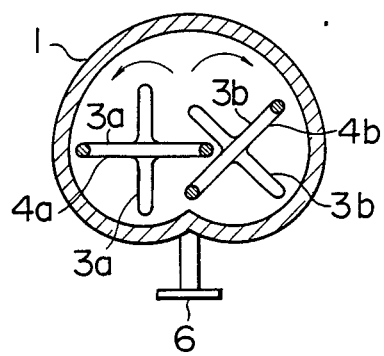

In the drawings, reference number 1 denotes a vessel body of a treatment apparatus which is a long cylindrical vessel having the section shown in FIG. 2 and which is horizontally positioned and is generally covered with a heat medium jacket over the external periphery thereof (not shown in the drawings). Reference numbers 2a and 2b denote pairs of rotational lug shafts which are arranged in parallel at each end of the vessel body 1 in the longitudinal direction, supported by bearings 5 fixed to the sides of the vessel body 1. The rotational lug shafts 2a, 2b at either the right or left end are connected to a drive apparatus (not shown). Agitator blades 4a, 4b comprising a plurality of bar rectangular frames 3a, 3b, respectively, which are adjacent and connected to each other at phase angles of 90 degrees are provided between the rotational lug shafts 2a, 2b, respectively, at the right and left ends. In addition, each agitator blade 4a or 4b is so arranged that, when seen from the direction of one pair of the rotational lug shafts 2a, 2b, the corresponding bar rectangular frames 3a or 3b are arranged at phase angles of 45 degrees relative to the bar rectangular frames 3a or 3b of the other agitator blades 4a or 4b, and the outer edges of each group of bar rectangular frames 3a or 3b pass as close to the center of rotation of the other group of 3b or 3a as possible. The agitator blades rotate from the inside toward the outside so that the outer edges of the bar rectangular frames 3a, 3b raise the liquid resting close to inner wall surface of the vessel body 1 up within the vessel. Reference numbers 6, 7 denote inlet and outlet nozzles for the liquid to be treated which are provided at first and second ends of the vessel body 1, respectively. Reference number 8 denotes an outlet nozzle for volatile substances which is provided in an upper portion of the second side of the vessel body 1.

In the configuration described above, the highly viscous liquid being treated, supplied into the vessel body 1 from the inlet nozzle 6, is moved toward the outlet nozzle 7 while being subjected to agitation and mixing by the agitator blades 4a, 4b. After the desired treatment operation has been carried out, the liquid is continuously discharged from the outlet nozzle 7 and any volatile substances produced within the vessel body 1 are discharged from the outlet nozzle 8. In this case, since the outer edges of the bar rectangular frames 3a, 3b of each of the agitator blades 4a, 4b rotate so that they come close to the center of rotation of the other bar rectangular frames 3a, 3b and completely scrape the inner wall surfaces of the vessel body 1, and agitation is performed by the bar structures, it is possible to sufficiently reduce the dead space and, thus, to substantially prevent the liquid adhering to and rotating together with the surfaces of rotational shafts and plate-shaped agitator blades.

Figure 4:
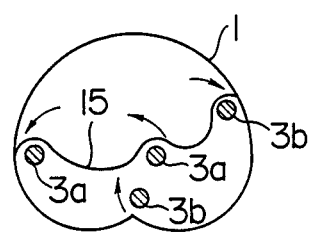
Figure 5:
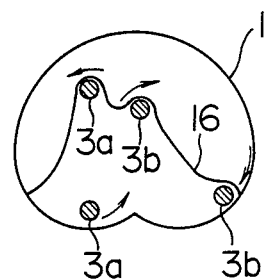

The agitation and mixing function specific to the present invention will now be described in detail with reference to FIGS. 4 to 6. In the sections $A_1, A_2, A_3 \ldots$ of FIG. 1, the highly viscous liquid being treated is subjected to an agitation function while forming the complicated sectional configurations shown in FIG. 5. Namely, the configuration of a liquid section 15 in sections $A_1$ and $A_3$ is as shown in FIG. 4 and the configuration of the liquid section 16 in the section $A_2$ between the sections $A_1$ and $A_3$ is as shown in FIG. 5. In this manner, a complicated liquid configuration is formed at each of the sections $A_1, A_2, A_3, \ldots$ and the liquid sectional configuration alternately changes along the longitudinal direction of the vessel body 1 so that it is possible to obtain a very good agitation function and a completely mixed state in each of the sections $A_1, A_2, A_3, \ldots$ In addition, within each liquid section, the liquid is brought into contact with the outer edges of the bar rectangular frames 3a, 3b at maximum speed, so that the shear rate is a maximum. Furthermore, since the agitator blades are formed of a material having a circular section, the agitation is conducted in a state with a minimum contact area so that it is possible to prevent the highly viscous liquid being treated from adhering to the surfaces of the rotational shafts and the plate-shaped agitator blades, and from scaling therefrom, as in the prior art.

Figure 1:
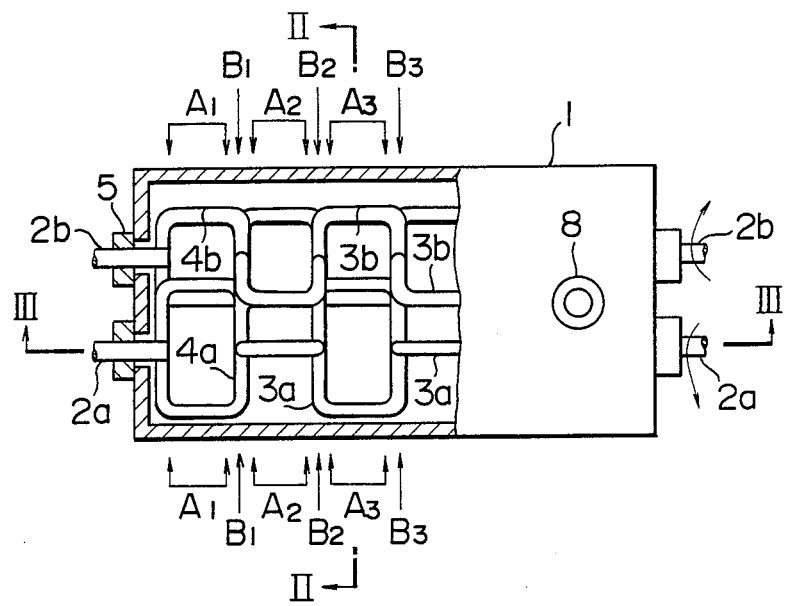
FIGS. 1 to 6 show an embodiment of a continuous treatment apparatus for a highly viscous material in accordance with the present invention.
Figure 6:
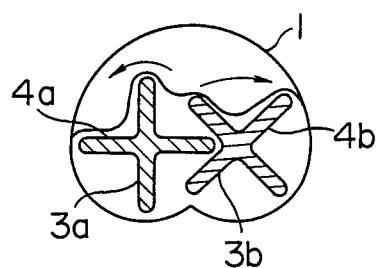

In sections $B_1, B_2, B_3, \ldots$ of FIG. 1, the sections of the bar rectangular frames 3a, 3b have a sectional configuration such that two cruciform sections are combined, as shown in FIG. 6. This configuration can prevent the liquid being treated from taking short cuts in the longitudinal direction of the vessel body 1 and keep the liquid being treated in a piston flow from the left to right in FIG. 1.

Consequently, the liquid to be treated is a completely mixed at each of the sections $A_1, A_2, A_3, \ldots$ and a partition effect can be obtained at the sections $B_1, B_2, B_3, \ldots$ between sections $A_1$ and $A_2$, $A_2$ and $A_3, \ldots$ so that it is possible to obtain a very good continuous agitation-mixing treatment which has little dead space and is similar to a piston flow. In the sections $B_1, B_2, B_3, \ldots$ ; shown in FIG. 6, the bar rectangular frames 3a, 3b which provide agitation are bar members so that the adhesion and scaling of the liquid can be reduced, when compared with the rotational shafts and plate-shaped agitator blades in the prior art.

When the condensation polymerization of polyethyleneterephthalate and polycarbonate, etc., is performed by the above-described continuous treatment apparatus, the viscosity of the liquid being treated is increased to several thousands to tens of thousands of poise by the polymerization reaction. However, since an agitation-mixing function which has substantially no dead space and which is similar to the piston flow, and a good surface-renewing function based thereon, can be obtained, it is possible to obtain a polymer with excellent qualities. Volatile substances such as ethylene glycol, which are by-products obtained during this polymerization, are removed by a vacuum apparatus (not shown) from the outlet nozzle 8.

In this removal of the volatile substances from the highly viscous liquid, the agitator blades 4a, 4b are rotated in directions such that the liquid is raised into the interior of the vessel body 1 and the liquid being treated is subjected to a tearing-off effect during its separation from the engagement of the outer edges of the bar rectangular frames 3a, 3b, so that a higher surface-renewing effect is obtained and the removal of the votilate substances is improved.

In a recommended embodiment of the present invention, the rotational lug shafts 2a, 2b and the bar rectangular frames 3a, 3b are made hollow and contain a heat medium flowing therein, so that it is possible to effect slow heating by means of the heat jacket (not shown) from the side wall of the vessel body 1 and remove the reaction heat and agitation heat from the surfaces of the bar rectangular frames 3a, 3b, thereby maintaining the liquid being treated at a constant temperature and improving product quality.

Figure 7:
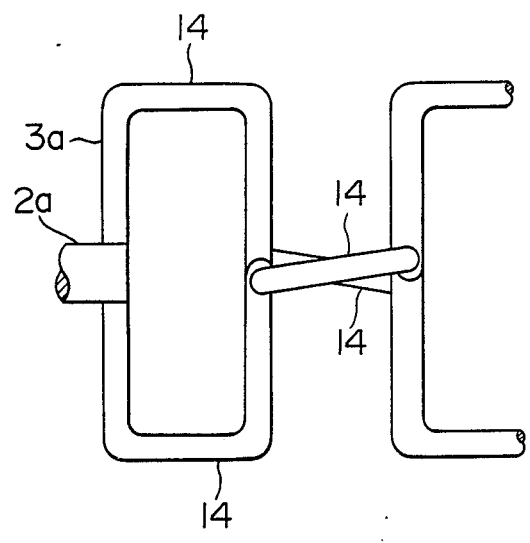
FIGS. 7 to 12 show other embodiments of the present invention.

In another recommended embodiment of the present invention in which, as shown in FIG. 7, the outer peripheral members 14 are formed on the bar rectangular frames 3a, 3b at angles in the longitudinal direction of the vessel body 1 so as to obtain a feed effect with respect to liquid being treated, the latter is subjected to the agitation-mixing function by the rotation of the agitator blades 4a, 4b and, at the same time, the liquid feed function is provided in the longitudinal direction of the vessel body 1. It is, therefore, possible to control the amount of the liquid residing in the vessel body 1 and to conduct stable continuous operations.

Figure 8:
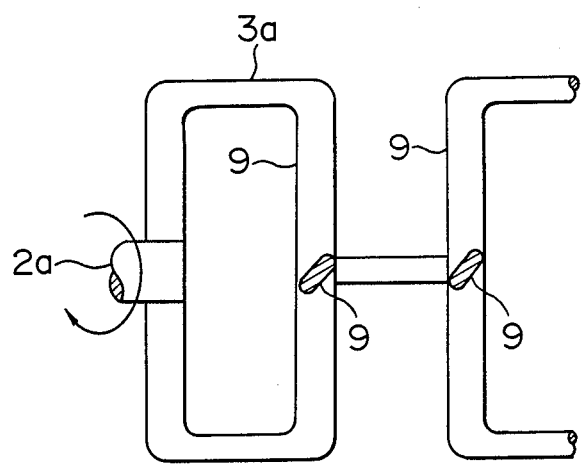
Figure 9:
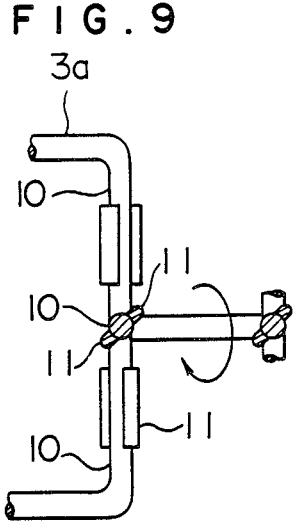

In still further recommended embodiments of the present invention in which, as shown in FIG. 8, the radial members 9 of the bar rectangular frames 3a, 3b have flat sectional configurations and are formed at angles relative to the longitudinal direction of the vessel body 1, or, as shown in FIG. 9, the radial members 10 of the bar rectangular frames 3a, 3b are provided with ribs 11 which are formed at angles relative to the rotation shafts, it is also possible to obtain the feed effect with respect to the liquid being treated in the longitudinal direction of the vessel body 1. In other words, as seen in FIGS. 8 and 9, when the agitator blade 4a is rotated in the direction of the arrow shown in these figures, the liquid being treated is subjected to the feed function from the left to right by the radial members 9 and the ribs 11.

Figure 10:
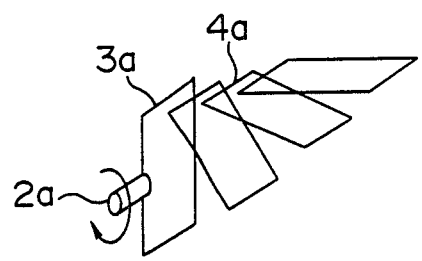

A still further embodiment of the present invention will be explained with reference to FIG. 10. This embodiment comprising the agitator blades 4a, 4b which have adjacent bar rectangular frames 3a, 3b connected to each other at phase angles of 30 degrees in the longitudinal direction can obtain a feed effect with respect to the liquid to be treated such that it is fed toward the right in the rotational direction of the shafts when the agitator blades are rotated in the direction of the arrow shown in the figure.

Figure 11:
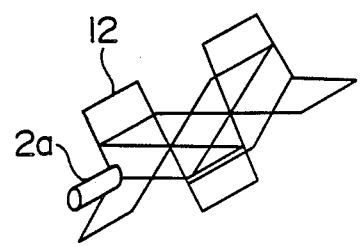

A still further embodiment of the present invention will be explained with reference to FIG. 11. This comprises agitator blades which have adjacent bar rectangular frames 12 formed at angles of 120 degrees in the three ways and connected to each other at phase angles of 60 degrees. Since the bar rectangular frames 12 of two agitator blades are arranged at phase angles of 60 degrees so as to increase the agitation function, a good mixing effect can be obtained.

Figure 12:
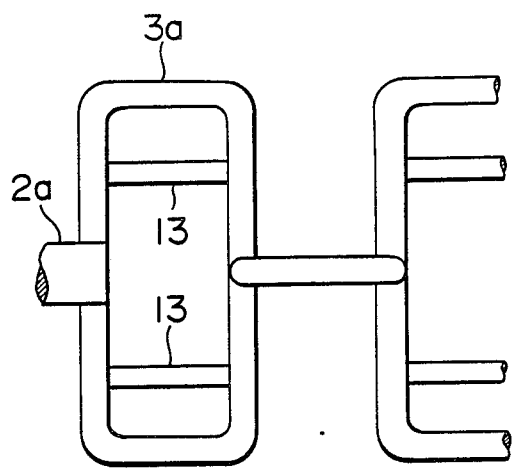

A still further embodiment of the present invention will be explained with reference to FIG. 12. This embodiment comprises agitator blades 4a, 4b which have bar rectangular frames 3a, 3b provided with reinforcing members 13 so that the strengths of the bar rectangular frames 3a, 3b and the agitation function can be increased, with good mixing effects thus being obtained. In this case, the reinforcing members 13 provided at a position away from the rotational center of the agitator blades 4a, 4b can prevent the liquid to be treated from adhering to and co-rotating with the rotational shafts.

Figure 13:
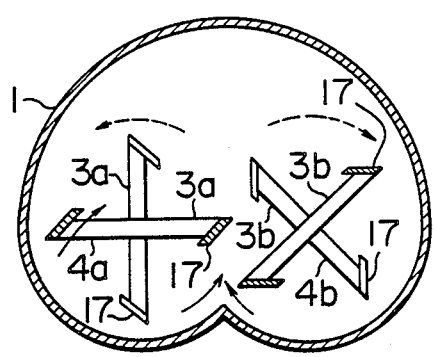
FIGS. 13 and 14 show further embodiments of the present invention.
Figure 14:
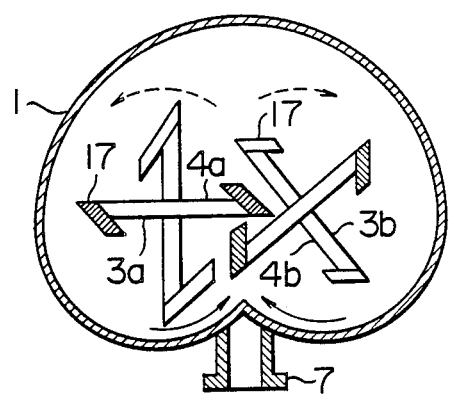

Still further embodiments of the present invention will be explained with reference to FIGS. 13 and 14. In these embodiments, the outer peripheral members of the bar rectangular frames 3a, 3b are plate-shaped members 17 which are provided at angles inclined relative to the inner wall surface of the vessel body 1. These plate-shaped members 17 are mounted such as to scrape off the liquid being treated which is adhering to the inner wall surface of the vessel body 1 in the agitation-mixing portion of FIG. 13 and to urge the liquid adhering in this way toward the inner wall surface in the liquid extracting portion shown in FIG. 14.

In the embodiments of the present invention, it is possible to increase the effect of scraping off the liquid being treated which is adhering to the inner wall surface of the vessel body 1 and the liquid in the lower portion of the vessel body 1 is pushed along the inner wall, thereby obtaining the effect of forcing the liquid into the outlet nozzle and thus facilitating its extraction.

Figure 15:
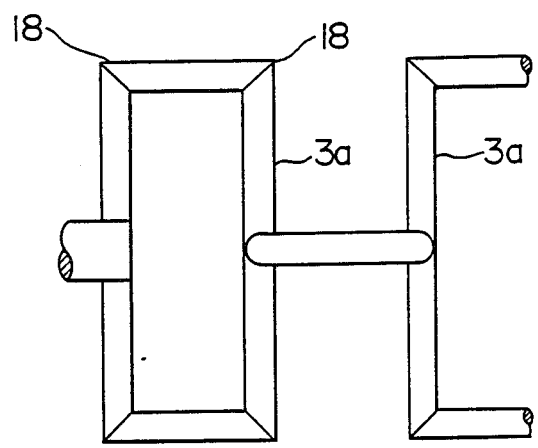
FIGS. 15 and 16 show other embodiments of the present invention and are side views of agitator blades comprising bar rectangular frames.

FIG. 15 shows a still further embodiment of the invention. In this embodiment, each of the bar rectangular frames 3a, 3b has four corner portions 18 at which two straight bar-like members are abutted and welded together at a right angle with respect to each other, and these frames do not include a curved peripheral portion. According to this embodiment, it is possible to completely scrape off the materials near the peripheral portion of the vessel.

Figure 16:
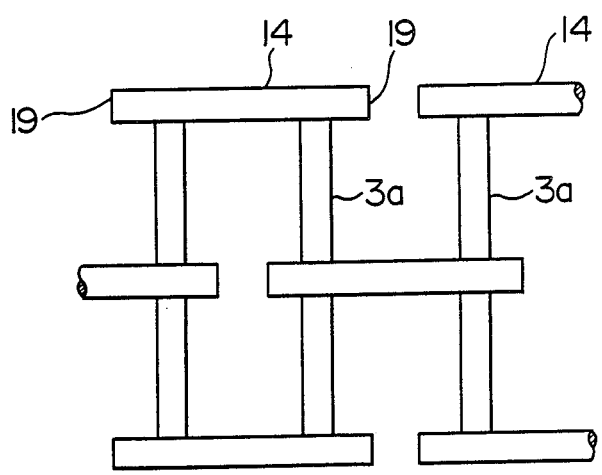

FIG. 16 shows another embodiment of the invention, in which the bar rectangular frames 3a, 3b include outer peripheral members 14 having longitudinal ends constituting ribs 19 projecting in an axial direction of the agitator blades. In this embodiment, the width of the inner wall surface of the vessel, along which the scraping of the materials is effected, is increased. Thus, scraping effects and the agitation effects are enhanced.

Figure 3:
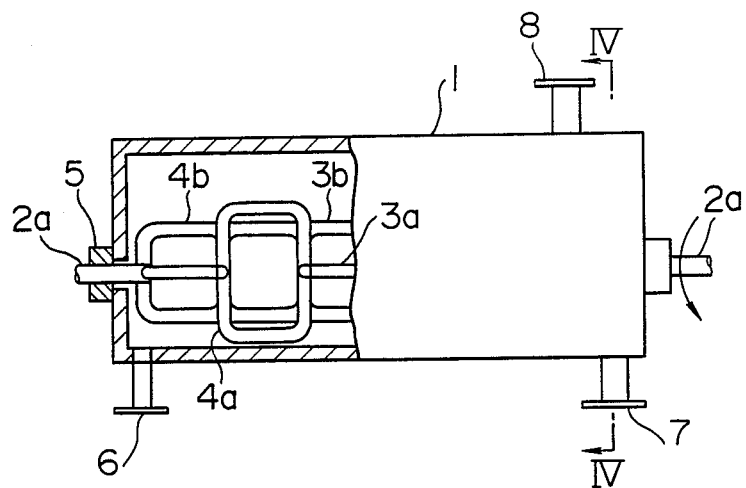
Figure 17:
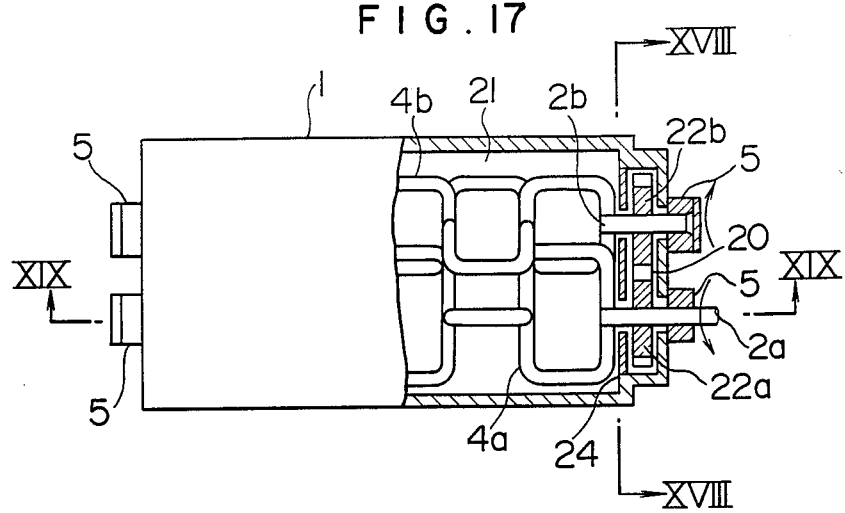
FIGS. 17 to 21 show still more embodiments of the present invention.
Figure 18:
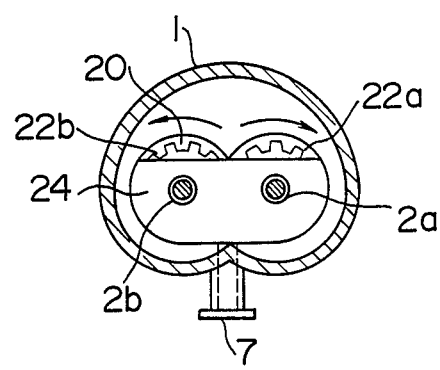
Figure 19:
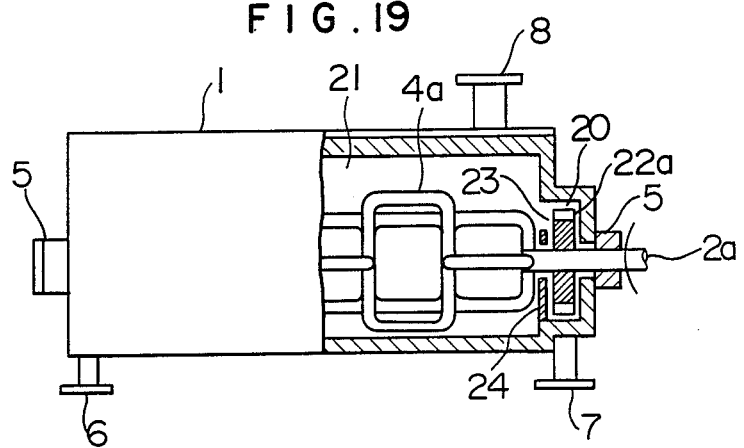

Still further embodiments of the present invention will be explained with reference to FIGS. 17 to 21. In FIGS. 17 to 19, the portions which are the same as those in FIGS. 1 to 3 are denoted by the same reference numbers and description thereof is omitted. Reference number 20 denotes a gear chamber which is provided adjacent to an agitation chamber 21 provided at one end of the cylindrical vessel body 1 in the longitudinal direction. The rotational lug shafts 2a, 2b passing through the gear chamber 20 are provided with gears 22a, 22b, respectively, in such a way that the gears engage with each other. The outer edges of the rotational lug shafts 2a, 2b are sealed with shaft seal covers except on the side of the drive apparatus. The gear chamber 20 and the agitation chamber 21 are divided by means of a slate 24 the upper portion of which is adapted to form a passage 23 for the liquid flowing therethrough. The distances between the gears 22a, 22b and the inner wall surface of the gear chamber 20 are determined (0.5 to 5 mm) such as to enable a liquid seal to be formed in the vessel body 1 by the liquid being treated. The rotational lug shafts 2a, 2b, as shown in FIG. 18, are driven through the gears 22a, 22b in such a direction that the agitator blades 4a, 4b cause the liquid to rise within the vessel body 1.

In the configuration described above, the highly viscous liquid being treated which has been supplied into the vessel body 1 from the inlet nozzle 6 is moved toward the outlet nozzle 7 while being subjected to the agitation-mixing function by the agitator blades 4a, 4b, and reaches the slate 24 provided at the end of the agitation chamber 21 after the intended treatment operation has been carried out. In this way, the liquid being treated flows into the gear chamber 20 through the passage 23 in the upper portion of the slate 24, is transferred to the lower portion by the rotation of the gears 22a, 22b, and is then discharged to the outside of the system from the outlet nozzle 7. The embodiments of the present invention are capable of transmitting rotational torque from the rotational lug shaft 2a on the driving side to that 2b on the driven side by means of the gears 22a, 22b and of quantitatively extracting the liquid.

When the condensation polymerization of polyethyleneterephthalate and polycarbonate, etc. are performed by the above-mentioned continuous treatment apparatus, the temperature in the vessel body 1 is increased to 270° to 290° C. by the heat jacket, a pressure reducing device is connected to the outlet nozzle 8 for discharging volatile substances so as to maintain the pressure in the vessel body 1 at 0.5 to 5 Torr, the intermediate polymer having a degree of polymerization of 5 to 20 is continuously supplied from the inlet nozzle 6, and by-products such as ethylene glycol are removed while agitating. Consequently, the final polymer having a degree of polymerization of 90 to 120 can be continuously obtained from the outlet nozzle 7.

Figure 20:
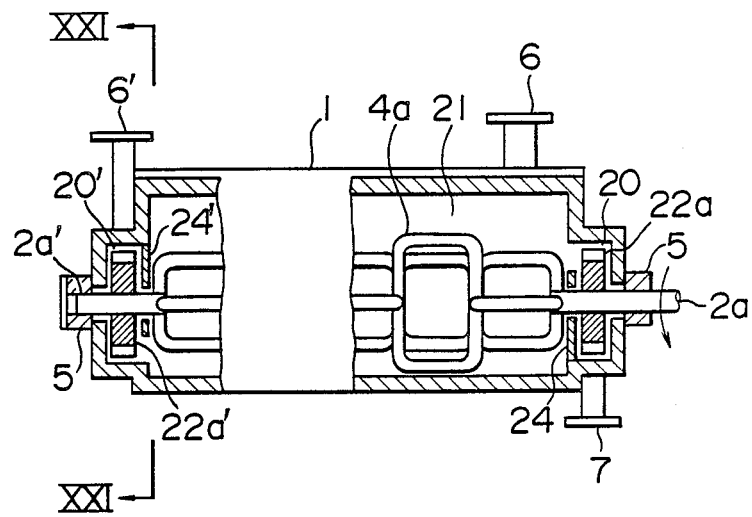
Figure 21:
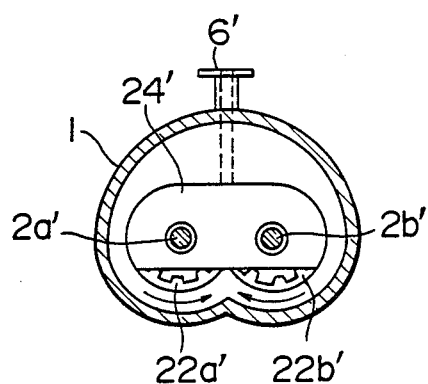
Figure 22:
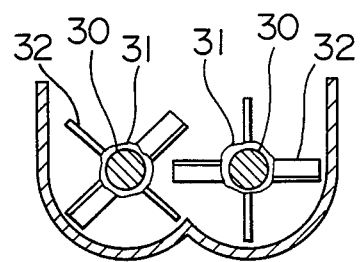
FIG. 22 is a longitudinally sectioned side view of a conventional apparatus.
Figure 23:
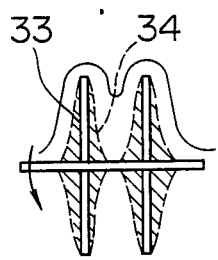
FIG. 23 is an explanatory view of the plate-shaped agitator blades of the conventional apparatus.

Other recommended embodiments of the present invention, as shown in FIGS. 20 and 21, are provided with a gear chamber 20' adjacent to an agitation chamber 21 at the other end of the vessel body 1 in the longitudinal direction and gears 22a' and 22b' engaged with rotational lug shafts 2a' and 2b' which pass through the gear chamber 20'. The gear chamber 20' and the agitation chamber 21 are partitioned by means of a submerged weir such that the lower portion of the gear chamber 20' communicates with the agitation chamber 21 and the inlet nozzle 6' for the liquid being treated is provided in such a position that it is intermediate between the gears 22a' and 22b' in the upper portion of the gear chamber 20'.

In this embodiment, the gear chamber 20' provided on the inlet side for the liquid to be treated can supply the liquid into the vessel body 1 through the inlet nozzle 6' by the rotation of the gears 22a', 22b' at a constant flow and thus makes provision of a supply apparatus for the liquid treated unnecessary, thereby simplifying the treatment apparatus. In addition, as shown in FIG. 20, the gear chambers 20, 20' and the gears 22a, 22b, 22a', 22b' provided at the outlet and the inlet for the liquid treated at both ends of the vessel body 1 in the longitudinal direction enable the supply flow and the extraction flow of the liquid treated to be simultaneously changed by changing the rotational speed of the rotational lug shafts 2a, 2b in a state in which there is a constant amount of liquid residing in the vessel body 1, thus allowing changes in the operating conditions to be effected in a stable manner.

Thus, the present invention prevents the highly viscous liquid treated from adhering to the surfaces of the rotational shafts and the agitator blades in the vessel body and thus from co-rotating therewith. Furthermore, the invention enable reduction in the amount of dead space and prevents deterioration in product quality due to scaling. In addition, it is possible to maintain the flow of all the liquid within the vessel body in a state similar to a piston flow and thus to continuously treat a highly viscous material of excellent quality. It is also possible to integrally form the agitator blades, the extraction apparatus, and the supply apparatus in the vessel body and thus to simplify the whole apparatus and reduce the production cost thereof.

We claim:

1. A continuous treatment apparatus for a highly viscous material comprising: a cylindrical vessel having two longitudinal ends, two rotational lug shafts provided in the cylindrical vessel, said shafts being arranged in parallel at both ends of said cylindrical vessel and extending in a longitudinal direction, agitator blades which have a plurality of rectangular frame members connected to each other between said two rotational lug shafts in the longitudinal direction, said rotational lug shafts being held so that edges of said rectangular frame members of one of said agitator blades enter a rotational region of the other agitator blade and pass therethrough.

2. A continuous treatment apparatus for a highly viscous material according to claim 1, characterized in that said agitator blades are connected to each other at phase angles of 90 degrees.

3. A continuous treatment apparatus for a highly viscous material according to claim 2, characterized in that said agitator blades are arranged at a phase angle of 45 degrees when viewed in an axial direction.

4. A continuous treatment apparatus for a highly viscous material according to claim 1, characterized in that said agitator blades have said rectangular frame members disposed in three directions at angles of 120 degrees and connected to each other at phase angles of 60 degrees.

5. A continuous treatment apparatus for a highly viscous material according to claim 4, characterized in that said agitator blades are arranged at phase angles of 60 degrees when viewed in an axial direction.

6. A continuous treatment apparatus for a highly viscous material according to claim 1, characterized in that said rotational lug shafts and said rectangular frame members are made hollow so as to form a heat medium passage therein.

7. A continuous treatment apparatus for a highly viscous material according to claim 1, characterized in that said rectangular frame members include outer peripheral members arranged at inclined angles in the longitudinal direction of said cylindrical vessel.

8. A continuous treatment apparatus for a highly viscous material according to claim 1, characterized in that said rectangular frame members include radial members which have flat sectional shapes and are arranged at inclined angles in the longitudinal direction of said cylindrical vessel.

9. A continuous treatment apparatus for a highly viscous material according to claim 1, characterized in that said rectangular frame members include radial members having ribs arranged at inclined angles in the longitudinal direction of said cylindrical vessel.

10. A continuous treatment apparatus for a highly viscous material according to claim 1, characterized in that reinforcing members are provided within inner spaces of outer peripheral members of said rectangular frame members.

11. A continuous treatment apparatus for a highly viscous material according to claim 1, characterized in that said agitator blades have a plurality of said rectangular frame members which are helically connected to each other at angles shifted in a stepwise fashion in the longitudinal direction of said cylindrical vessel.

12. A continuous treatment apparatus for a highly viscous material according to claim 1, characterized in that said rectangular frame members include outer peripheral members made up of plate-shaped members.

13. A continuous treatment apparatus for a highly viscous material according to claim 1, characterized in that said rectangular frame members include outer peripheral members having ends with ribs which project in an axial direction of said rectangular frame members.

14. A continuous treatment apparatus for a highly viscous material according to claim 1, characterized by forming said rectangular frame members of bar rectangular frames.

15. A continuous treatment apparatus for a highly viscous material comprising: a cylindrical vessel having two ends, said cylindrical vessel defining therein an agitation chamber; two rotational lug shafts provided in the cylindrical vessel, said shafts being arranged in parallel at both ends of said cylindrical vessel and extending in a longitudinal direction; agitator blades which have a plurality of rectangular frame members connected to each other between said two rotational lug shafts in the longitudinal direction, said rotational lug shafts being held so that edges of said rectangular frame members of one of said agitator blades enter a rotational region of the other agitator blade and pass therethrough; a gear chamber provided adjacent to said agitation chamber at an end of said cylindrical vessel; gears which are engaged with each other and are respectively provided on said two rotational lug shafts which pass through said gear chamber; a passage provided in a portion of said gear chamber and communicating with said agitation chamber; and a nozzle provided at another portion of said gear chamber and communicating with the exterior.

16. A continuous treatment apparatus for a highly viscous material according to claim 15, further comprising an inlet nozzle for a liquid to be treated provided at one end of said cylindrical vessel, said gear chamber being provided at the other end of said cylindrical vessel, and an outlet nozzle for said liquid to be treated provided at a lower portion of said gear chamber.

17. A continuous treatment apparatus for a highly viscous material according to claim 15, characterized in that said gear chamber is provided at one end of said cylindrical vessel, an inlet nozzle for a liquid to be treated is provided at an upper portion of said gear chamber, and an outlet nozzle for said liquid to be treated is provided at the other end of said cylindrical vessel.

18. A continuous treatment apparatus for a highly viscous material according to claim 15, characterized in that gear chambers are provided at both ends of said cylindrical vessel, an inlet nozzle for a liquid to be treated is provided at an upper portion of said gear chamber at one end of said cylindrical vessel, and an outlet nozzle for said liquid to be treated is provided at a lower portion of the gear chamber at the other end of said cylindrical vessel.

* * * * *